United States Patent [19]
Chimoto

[11] Patent Number: 5,550,961
[45] Date of Patent: Aug. 27, 1996

[54] IMAGE PROCESSING APPARATUS AND METHOD OF CONTROLLING THE SAME

[75] Inventor: Hiroyuki Chimoto, Yokohama, Japan

[73] Assignee: Kabushiki Kaisha Toshiba, Kawasaki, Japan

[21] Appl. No.: 202,133

[22] Filed: Feb. 25, 1994

[30] Foreign Application Priority Data

Feb. 25, 1993 [JP] Japan ................................. 5-036652

[51] Int. Cl.$^6$ .................................................. G06F 15/00
[52] U.S. Cl. ............................................................ 395/133
[58] Field of Search .................................... 395/130, 162,
395/164, 166, 133; 345/185; 364/521 MS File,
522 MS File

[56] References Cited

U.S. PATENT DOCUMENTS

| | | | |
|---|---|---|---|
| 4,163,229 | 7/1979 | Bodin et al. | 340/745 |
| 4,945,495 | 7/1990 | Ueda | 364/518 |

FOREIGN PATENT DOCUMENTS 0286416  10/1988  European Pat. Off. .

OTHER PUBLICATIONS

Foley; Computer Graphics, Principles and Practice, 2nd ed; Addison–Wesley Publishing Co; pp. 168, 857–860; 1990.
Mailloux, Jeff; Speed Memory, Ease Timing Requirements With VRAM Functions; Electronic Design V 37, N 24 p. 95(5); Nov. 23, 1989.
T. Sakurai, "Transparent–Refresh DRAM (TReD) Using Dual–Port DRAM Cell", IEEE Custom Integrated Circuits Conference, 1988.
Nikkei Computer Craphics, Product review "Reality Engine"; G. Kakogawa; Oct. 1992.
Shires, "A New VLSI Graphics Coprocessor—The Intel 82786", IEEE Comuter Graphics And Applications, vol. 6, No. 10, Oct. 1986, New York, pp. 49–55.

*Primary Examiner*—Phu K. Nguyen
*Attorney, Agent, or Firm*—Cushman Darby & Cushman, L.L.P.

[57] ABSTRACT

Texture mapping is performed on polygons at the same speed as a polygon drafting process without a texture cache, thereby reducing complexity without an increase in cost. An image memory is constituted in a double-buffer structure, and an address line, a data line and a memory control line are individually connected to each buffer. One of the two buffers is used for texture data, and the other for a drawing result. The texture data is one-dimensional, and the size thereof is less than a maximum value of a column address. The other buffer is an imaginary double buffer with two buffers, one of the buffers being used for reading out image data from a SAM port, the other being used for writing image data produced from polygons. Read/write switching is effected in a vertical flyback period. In the read-out buffer, just after row-directional read-out, the associated row is cleared by the flash write function of a multiport DRAM in a horizontal flyback period, and the next read-out address is output. In synchronism with this, texture data is refreshed.

12 Claims, 3 Drawing Sheets

IMAGE PROCESSING APPARATUS AND METHOD OF CONTROLLING THE SAME

BACKGROUND OF THE INVENTION

1. Field of the Invention

The present invention relates to an image processing apparatus for performing three-dimensional (3-D) computer graphics (CG).

2. Description of the Related Art

Recently, game machines using computer graphics (CG) have become widely prevalent. Most of them are two-dimensional (2-D) CG systems. However, images produced by CG systems are generally short of naturalness. In order to overcome this drawback, a natural image is prepared as texture data, and a model image is subjected to a texture mapping process.

A conventional inexpensive CG system has a structure as shown in FIG. 1. Specifically, a graphics chip 100 is connected to a single address line 101 and a data line 102. The address line 101 and data line 102 are connected to first and second image memories 103 and 104. Each of the image memories 103 and 104 comprises a texture data area and a pixel data area. A model produced by pixel data is painted out by texture data by the following process. At first, the graphics chip 100 fetches polygon data from an external bus 105 and then texture data from the image memory 103. The graphics chip 100 executes graphics processing and writes the processing result (pixel data) in the image memory 103. Alternatively, texture data in the image memory 104 may be fetched to subject the pixel data in the image memory 103 to map processing.

In the above-described conventional CG system, the graphics chip 100 does not perform the fetching of texture data operation and the pixel data and writing in the image memory operation in parallel. Instead, the operations are performed serially, and a long processing time is required. This problem results from common use of the address line and data line in two memory banks (image memories 103 and 104).

The reason why the address line and data line are shared by the image memories 103 and 104 is that the number of pins can be decreased and the manufacturing cost decreased. Besides, since the conventional graphics chip 100 does not include a CRT controller, it is necessary to read out data from the image memory 103 or 104 and output the data to the external bus 105. When the internal memory of the graphics chips 100 is used to output data to the external bus 105, system control is made easier by sharing the address line and data line for the image memories 103 and 104. In the conventional system, in order to simplify the mapping algorithm, texture data is stored in a two-dimensional fashion. As a result, when multiport DRAMs are used as image memories 103 and 104 and are accessed, a considerable page break may frequently occur. Thus, the speed of the processing for subjecting polygons to texture mapping is much lower than that of the processing for drawing only polygons. Moreover, although the multiport DRAMs are used as image memories 103 and 104 in the conventional system, a refresh time period for refreshing a desired row address is set independently. Thus, the access to the DRAM is prohibited in the refresh time period, and the entire processing speed decreases further.

In order to solve the above problems, there is known a method of providing a texture cache memory within a system or within a graphics chip and making use of it as a data buffer. However, in a video game machine whose system is inexpensive, an increase in cost due to provision of a cache memory is a problem. Furthermore, even if a cache memory is provided, because original data is two-dimensional, a considerable degree of page break occurs when texture data is fetched in the cache memory. Consequently, the processing speed lowers.

As has been described above, in the conventional 3-D computer graphics, when texture mapping is performed on polygons, the processing speed lowers and high-speed plotting cannot be achieved. Furthermore, the manufacturing cost increases due to provision of a texture cache memory.

SUMMARY OF THE INVENTION

The object of the present invention is to provide an image processing apparatus, used in a video game apparatus, for performing texture mapping on polygons at the same speed as the processing for mapping only polygons, without using a texture cache memory.

In order to achieve this object, there is provided an image processing apparatus having coordinate conversion means for conversion to a display coordinates system on the basis of model information consisting of polygons, arithmetic operation means for calculating a luminance gradient of each vertex of the polygons, means for storing the result of arithmetic operations of the arithmetic operation means, rendering means for performing shading, texture mapping, etc. of the polygons on the basis of the result of the arithmetic operations, means for storing a result of drawing in an image memory constituted basically by a multiport DRAM, and means for controlling the image memory, said apparatus comprising:

an image memory constituted by a multiport DRAM including a first memory and a second memory to which address lines, data lines, and memory control lines are individually connected;

determination means for determining whether the size of the second memory is greater than double the display size of an image to be displayed;

setting means for fixedly setting said first memory as a texture memory for storing texture data and setting said second memory as a frame memory for storing the result of drawing, if the size of the second memory is greater than double the display size, said setting means also setting the internal structure of the second memory as imaginary double buffers divided by information of a highest bit for the address data, the internal data structure of said texture memory being such that two-dimensional texture data is expressed as one-dimensional texture data, the size of the one-dimensional texture data being less than a maximum value of a column address of said first memory;

buffer switching means for switching, within a vertical flyback time period, double buffers set within the second memory such that one of said buffers is used for reading out image data from a SAM (serial access memory) port, and the other of said buffers is used for writing image data produced from the polygons into a RAM port;

detecting means for detecting completion of reading out of the image data of every scan line of said buffer for reading out the image data;

clearing means for clearing the scan line detected by said detecting means within a horizontal flyback time period (horizontal blanking time period) by means of a flash write function of said multiport DRAM;

next-address output means for outputting an address of the next-readout scan line of the scan line cleared by said clearing means; and refreshing means for refreshing the texture memory in synchronism with the clearing processing of said clearing means and the address output from said next-address output means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will now be described with reference to the accompanying drawings.

Figure 1:
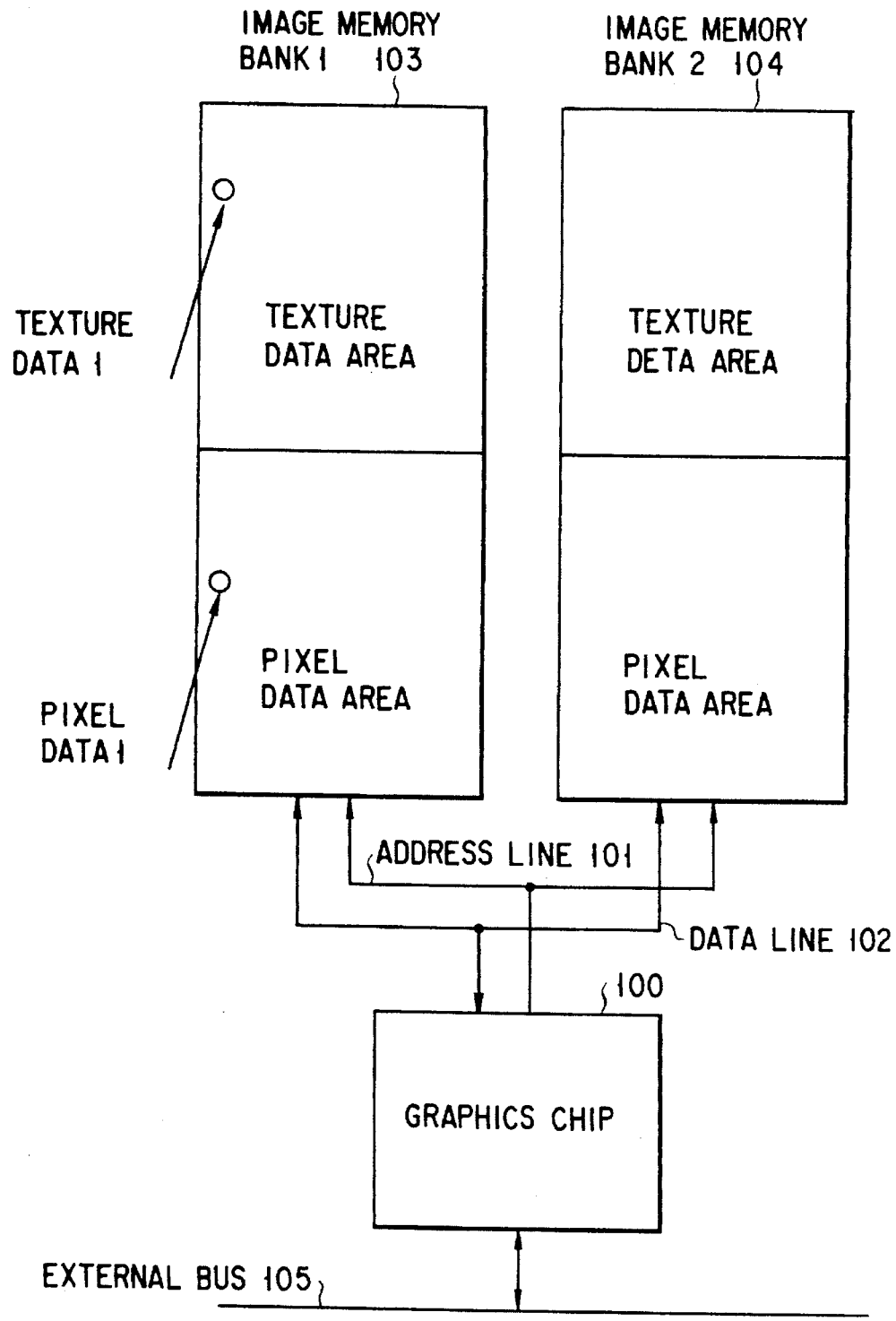
FIG. 1 Is a view for explaining a method of using a conventional image memory.
Figure 2:
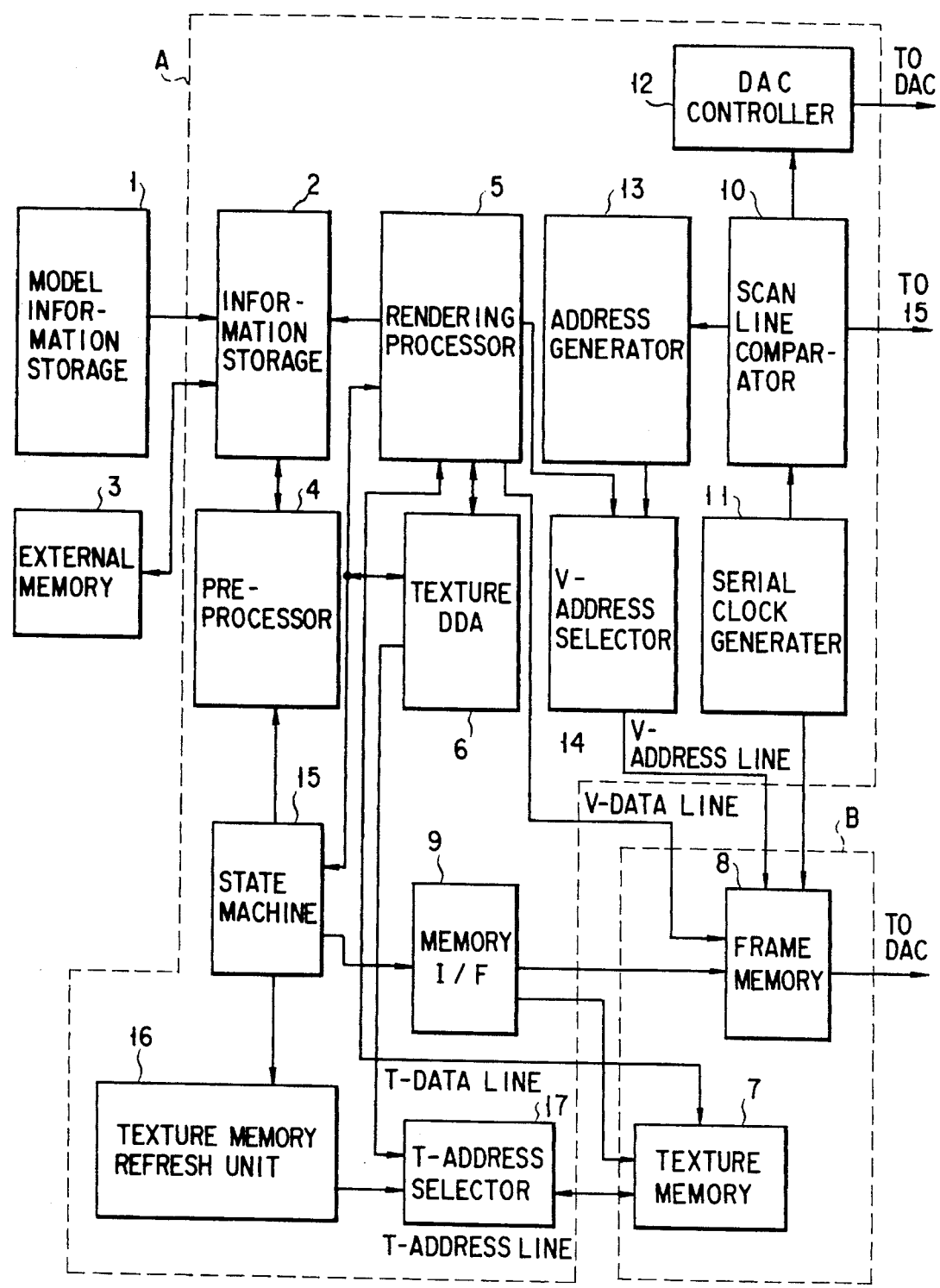
FIG. 2 shows the structure of an embodiment of the present invention.

FIG. 2 shows the structure of an image processing system apparatus according to an embodiment of the present invention.

In FIG. 2, a block indicated by a broken line A is a graphics chip, and a block indicated by a broken line B is an image memory. The image memory B comprises a well-known multiport DRAM.

In this system, the image memory B has a double-buffer structure (a texture memory 7 and a frame memory 8 are shown in FIG. 2). Each buffer (texture memory 7, frame memory 8) is individually connected to an address line, a data line and a memory control line.

The frame memory 8 is used for storing the result of drawing, and the texture memory 7 is used for storing texture data.

The internal data array of the texture memory 7 is a one-dimensional texture data array and the size of the one-dimensional texture data is less than the maximum value of column addresses of the memory. The internal structure of the frame memory 8 is divided by information of a highest bit for the address data, and one frame memory 8 is used as an imaginary double buffer memory. One buffer and the other buffer are alternately switched for write and read in a vertical fly-back time period. An SAM (serial access memory) port is used as an image data read-out port, and a RAM (random access memory) port is used as an image data write port for writing of data produced by use of polygons.

When a mapping data producing process is started, the image memory B includes texture memory 7 and frame memory 8. Then, it is determined whether or not the size of the frame memory 8 is greater than double the display size. This determination is effected when the system is powered on. Predetermined data is written from the top address in the image memory B via a V data line, and the data is read out from the image memory B. The read-out data is monitored by a system controller (not shown), and thereby the size of the image memory B is determined. If the size of the frame memory 8 is greater than double the display size, the frame memory 8 is used as imaginary double buffers. The screen display size is determined, e.g., in accordance with the size of a model to be mapped.

The structure and operation of the entire system will now be described.

Polygon-based model information (coordinate values of display of each vertex, luminance, texture coordinate values, etc.) is stored in a model information storage 1 such as a ROM cassette, hard disk, or CD-ROM. A polygon defines the basic cell for 3-D mapping.

Polygon information constituting a model is stored directly in an information storage memory 2, or it is temporarily stored in an external memory 3 and then provided to information storage memory 2. A pre-processor 4 subjects a model stored in the information storage memory 2 to, e.g. transformation (arline transformation) from world coordinates to viewpoint coordinates or perspective transformation. The information obtained by this transformation process is transferred to the information storage or external memory 3. After the pre-processor 4 has completed pre-processes, such as coordinate transformation, perspective transformation, planar formula processing, luminance gradient processing, with respect to all polygons, each polygon information item is transferred from the information storage memory 2 or external memory 3 to a rendering processor 5. The rendering processor 5 performs analysis processing by DDA (Digital Differential Analysis) such as shading of polygons. When texture is mapped on polygons subjected to a rendering arithmetic operation, i.e. shading processing, a texture number of a texture to be mapped on model (polygon) information and texture coordinates corresponding to vertices of polygons are read out of the information storage memory 2 and transferred to a texture DDA 6. The DDA 6 calculates an address in the texture memory 7 corresponding to each pixel of the polygons on the basis of the texture coordinates of the vertices of polygons.

In FIG. 2, the texture memory 7 and frame memory 8 are shown as separate units. However, as described above, they are constituted by a multiport DRAM. In this system, the image memory (multiport DRAM having a flash write function) has a double buffer structure. Address lines, data lines and memory control lines are separately connected to the individual buffers. One of the buffers is used as texture memory 7 for storing texture data, and the other as frame memory 8 for storing the result of drawing.

The address calculated by the texture DDA 6 is selected by a T-address selector 17 and transferred to the texture memory 7 via a T-address line. Then, the texture data is transferred from the texture memory 7 to the rendering processor 5 via a T-data line. The rendering processor 5 executes processes such as α-Blending, thereby producing drawing data. The drawing data is supplied to the frame memory 8 via a v-data line.

On the other hand, a V-address selector 14 obtains information to the effect that the present mode from a state machine 15 is the drawing mode, and selects an address from the rendering processor 5. The selected address is provided to the V-address. Thus, the drawing data is stored in the frame memory 8.

In these processes, the calculation of the texture coordinates by the texture DDA 6 is effected in units of a pixel, and therefore, it is effected in synchronism with the DDA processing for shading carried out in the rendering processor 5, thus enabling pipeline processing to be performed.

Figure 3:
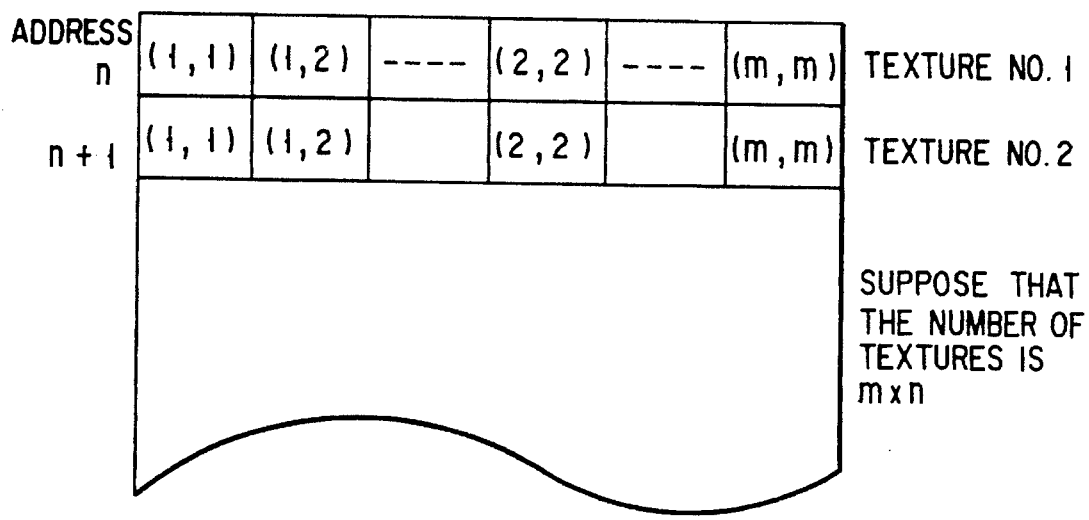
FIG. 3 shows an example of the contents of a texture memory used in the apparatus shown in FIG. 2.

FIG. 3 shows the structure of texture data within the texture memory 7. Specifically, two-dimensional texture data is stored in the state in which it is expressed as one-dimensional texture data.

When texture data is constituted within the texture memory 7 in the above manner, all texture data relating to one texture is present one-dimensionally within a page in the DRAM. Thus, only by controlling a memory control signal (row address strobe (RAS),etc.) necessary for first accessing to a page in the memory 7, can the high-speed page mode operation or pipeline mode operation peculiar to the DRAM be performed. While a single texture mapping operation is performed, no page break occurs, and a high-speed drawing process can be executed without break of pipe. The memories 7 and 8 are controlled by control signals from a memory interface (memory I/F)9. Data is read out from the aforementioned other buffer of the frame memory 8, and the read-out data is fed to a DAC (digital-to-analog converter). At this time, a scan line comparator 10 counts a scan-line-directional image read-out serial clock produced by a serial clock generator 11, and determines whether or not data transfer corresponding to the number of pixels in the scan line direction has been completed. If it is completed, end signals are fed to the state machine 15 and a DAC (digital-to-analog converter) controller 12. Then, the state machine 15 sends processing pause information to the rendering processor 5. On the other hand, the DAC controller 12 outputs a horizontal blanking signal.

An end signal is also sent to an address generator 13. Then, the address generator 13 outputs a row address of a scan line from which data read-out has been finished and supplies the row address to a V-address selector 14. In addition, the state machine 15 sends flyback mode information to the V-address selector 14. Thereby, the V-address selector 14 selects the row address from the address generator 13 and outputs it to a V-address line. In this case, a flash write operation of the multiport DRAM is used, and the control signal is output from the memory I/F 9. The stored data relating to the associated line is cleared by the flash write. Thereafter, for reading out the next image data, a row address is generated by the address generator 13 and output to the V-address line. Thereby, in the read-out side buffer of the frame memory 8, data is transferred to the SAM port and the data can be read out.

As described above, a flyback mode is set during a part of the horizontal flyback time period, and information from the address generator 13 flows in the V-address line. Thus, the drafting process taking place in the rendering processor 5 is not effected.

By making use of this time period (i.e., a part of the horizontal low address strobe), the texture memory 7 is refreshed in the RAS (low address strobe)-only-refresh type mode. Specifically, when a texture memory refresh unit 16 receives flyback mode information from the state machine 15, it produces a row address (n) to be refreshed. The T-address selector 17 selects the row address (n) from the texture memory refresh unit 16 and outputs it to the texture memory 7 for RAS-only-refresh. Subsequently, the texture memory refresh unit 16 produces a row address (n+1) and refreshes the (n+1)th address similarly. After refreshing, the operation mode of the T-address selector 17 is changed to the drafting mode by a command from the state machine 15, and it selects a T-address line from the texture DDA 6.

The reason why the two row addresses of the texture memory 7 can be refreshed in synchronism with the control of the frame memory 8 is as follows: since the timing for clearing the stored content of the row address immediately after read-out and the timing for designating the next read-out row address are provided for the frame memory 8, the address is supplied twice and the texture memory 7 and frame memory 8 are constituted in the DRAM.

After the image data has been read out from one of the buffers of the frame memory 8, the data relating to the vertical flyback time period is sent to the state machine 15, and one of the buffers is used for data write and the other for data read. The switching between the read mode and write mode of both buffers is effected by data fed from the state machine 15 via the memory I/F 9.

Figure 4:
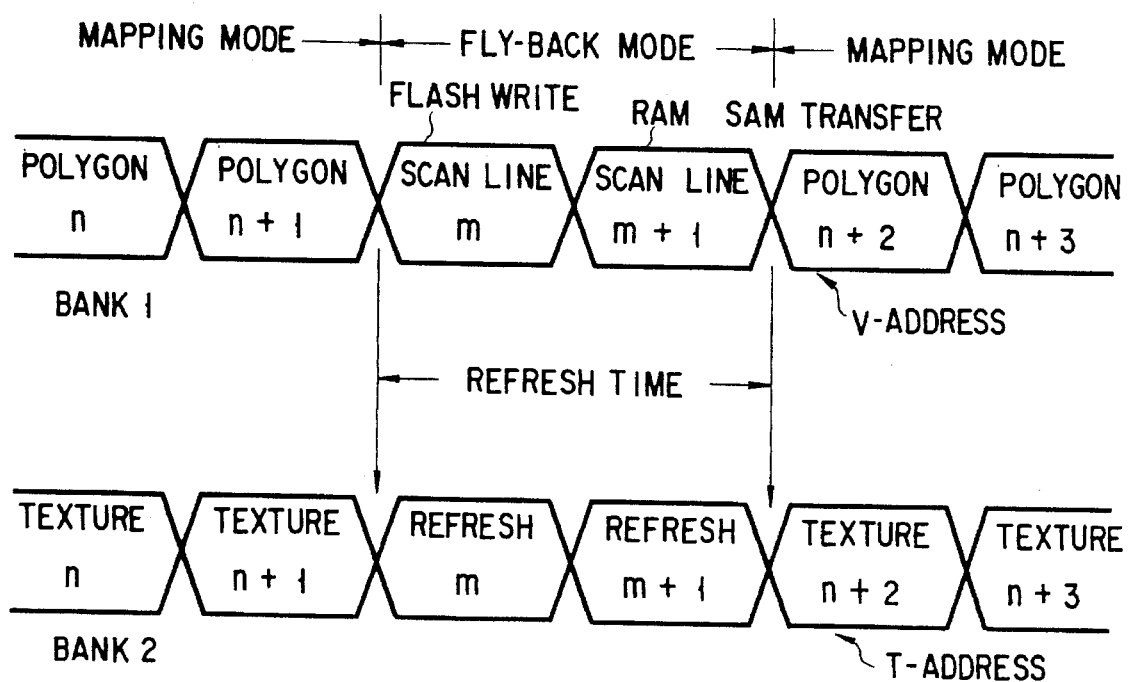
FIG. 4 is a timing chart for explaining the operation of the apparatus shown in FIG. 2.

FIG. 4 shows a simple timing chart of the present system.

An upper portion of FIG. 4 illustrates a timing of the frame memory 8, showing a row address m of a scan line and a row address (m+1) for the next read-out. At the time the row address (m+1) is designated, the stored data is transferred to the SAM port side within the memory 8. A lower portion of FIG. 4 illustrates a timing of the texture memory 7. In synchronism with the address control of the frame memory 8, the address m and address (m+1) of the texture memory 7 are refreshed. In this manner, by refreshing the addresses of two rows of the texture memory 7, the texture memory 7 can be refreshed at a speed twice as high as the read-out speed of the frame memory 8.

As has been described above, according to this invention, there is provided an image processing apparatus having coordinate conversion means for conversion to a display coordinates system on the basis of model information consisting of polygons, arithmetic operation means for calculating a luminance gradient of each vertex of the polygons, means for storing the result of arithmetic operations of the arithmetic operation means, rendering means for performing shading, texture mapping, etc. of the polygons on the basis of the result of the arithmetic operations, means for storing a result of drawing in an image memory constituted basically by a multiport DRAM, and means for controlling the image memory. In this apparatus, an image memory (B) constituted by a multiport DRAM includes a first memory (7) and a second memory (8) to which address lines, data lines, and memory control lines are individually connected. Determination means determines whether the size of the second memory (8) is greater than double the display size. Setting means (15, 9) sets fixedly the first memory (7) as a texture memory for storing texture data and sets said second memory (8) as a frame memory for storing the result of drawing, if the size of the second memory (8) is greater than double the display size. The setting means also sets the internal structure of the second memory (8) as imaginary double buffers divided by information of a highest bit for the address data. Of the imaginary double buffers, one of said buffers is used for reading out image data from a SAM (serial access memory) port, and the other of said buffers is used for writing image data produced from the polygons into a RAM port. In the internal data structure of the texture memory, two-dimensional texture data is expressed as one-dimensional texture data, the size of the one-dimensional texture data being less than a maximum value of a column address of said first memory. Buffer switching means (9, 15) switches, within a vertical flyback time period, the double buffers set within the second memory (8) so that one of them is used for data read and the other for data write. Detecting means (10, 11) detects completion of reading out of the image data of every scan line of said buffer for reading out the image data. Clearing means (13, 14, 15, 9) clears the scan line detected by said detecting means within a horizontal flyback time period (horizontal blanking time period) by means of a flash write function of said multiport DRAM. Next-address output means (13, 14, 15, 9) outputs an address of the next-readout scan line of the scan line cleared by said clearing means. Refreshing means (15, 16) refreshes the texture memory in synchronism with the clearing processing of said clearing means and the address output from said next-address output means.

By the above means, in the image processing apparatus for performing 3-D computer graphics, the image memory (B) using the multiport DRAM is set as texture memory 7 and frame memory 8. If the size of the memory 8 is greater than twice the screen size, one of the memories is used for storing drafting data, and the other for storing texture data. Flash write is effected on the line which has completely been read in the horizontal flyback period. At the same time, an address for transferring data to the SAM port for read-out is generated, and synchronously the texture memory is refreshed, thereby preventing a decrease in processing speed due to the refresh cycle. In the texture memory 7, conventional two-dimensional texture data is rearranged in a one-dimensional fashion, and the texture size data is made to fall within DRAM page size. Thereby, page break does not occur and high-speed texture mapping is performed. As a result, a decrease in processing speed, which has conventionally occurred in effecting texture mapping on polygons, does not occur. The manufacturing cost does not increase owing to the addition of texture caching. Therefore, inexpensive, high-speed texture mapping can be realized.

The present invention is not limited to the above embodiments, and various modifications can be made.

As has been described above, according to this invention, page break in DRAM or a decrease in processing speed due to refresh timing does not occur, and a high-speed texture mapping process can be performed without adding a texture cache memory.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus having means for providing model information defining an image, said model information being based on polygons having a plurality of vertices, arithmetic operation means for calculating a luminance gradient of each vertex of said polygons, means for storing an output of said arithmetic operation means, rendering means for performing texture operations on said polygons based on an output of said arithmetic operation means, and a display for displaying said image, said apparatus comprising:

a multiport DRAM defining an image memory including a first memory portion and a second memory portion to which address lines, data lines, and memory control lines are individually connected;

setting means for setting said first memory portion as a texture memory for storing texture data therein and for setting said second memory portion as a frame memory for storing an output of said rendering means as image data, if a size of said second memory portion is greater than double a size of said display, said setting means also setting said second memory portion as imaginary double buffers, an internal data structure of said texture memory being such that two-dimensional texture data is expressed as one-dimensional texture data and stored in said texture memory as said one-dimensional texture data, and wherein a size of said one-dimensional texture data is less than a maximum value of a column address of said first memory portion;

buffer switching means for switching, within a vertical flyback time period, between said imaginary double buffers set within said second memory portion such that one of said imaginary double buffers is used for reading out said image data from a serial access memory port, and a remaining other of said imaginary double buffers is used for writing image data produced from said polygons into a RAM port;

detecting means for detecting completion of reading out of said image data of every scan line of said buffer for reading out said image data;

clearing means for clearing said scan line detected by said detecting means within a horizontal flyback period by means of a flash write function of said multiport DRAM;

next-address output means for outputting an address of a next-readout scan line of said scan line cleared by said clearing means;

refreshing means for refreshing a plurality of lines in said texture memory in synchronism with said clearing process performed by said clearing means and said address output operation of said next-address output means during a single horizontal flyback period by a RAS-only-refresh function; and means for synchronizing operation of said arithmetic operation means and said rendering means during a drawing mode to provide pipeline processing.

2. An image processing apparatus according to claim 1, further comprising a state machine, wherein operations performed by said clearing means, said next-address output means and said refreshing means take place based on outputs of said state machine so that said refreshing, said clearing process and said next-address outputting process are performed in a synchronized manner.

3. A method for controlling an image processing apparatus having means for providing model information defining an image, said model information being based on polygons having a plurality of vertices, arithmetic operation means for calculating a luminance gradient of each vertex of said polygons, means for storing an output of said arithmetic operation means, rendering means for performing texture operations on said polygons based on an output of said arithmetic operations, means for storing an output of said rendering means in an image memory constituted by a multiport DRAM, means for controlling said image memory, wherein said image memory includes a first memory portion and a second memory portion to which address lines, data lines, and memory control lines are individually connected, and a display having a display size for displaying said image, said method comprising:

setting said first memory portion as a texture memory for storing texture data, setting said second memory portion as a frame memory for storing said output of said rendering means, if a size of said second memory portion is greater than double said display size, and setting an internal structure of said second memory portion as imaginary double buffers, an internal data structure of said texture memory being such that two-dimensional texture data is expressed as one-dimensional texture data, and wherein a size of said one-dimensional texture data is less than a maximum value of a column address of said first memory portion;

switching, within a vertical flyback time period, between said imaginary double buffers set within said second memory portion such that one of said buffers is used for reading out image data from a serial access memory port, and a remaining other of said buffers is used for writing image data produced from said polygons into a RAM port;

detecting completing of reading out of said image data from each scan line of said buffer for reading out said image data;

clearing said scan line detected by said detecting means within a horizontal flyback period by means of a flash write function of said multiport DRAM;

outputting an address of a next-readout scan line of said scan line cleared by said clearing means;

refreshing a plurality of lines in said texture memory in synchronism with said clearing process of said clearing means and said address output operation of said next-address output means during a single said horizontal flyback period by a RAS-only-refresh function; and means for synchronizing operation of said arithmetic operation means and said rendering means during a drawing mode to provide pipeline processing.

4. A method according to claim 3, wherein said clearing, said outputting and said refreshing steps take place based on outputs of a state machine so that said clearing, said outputting, and said refreshing steps are performed in a synchronized manner.

5. An image processing apparatus comprising:

an image memory constituted by a multiport DRAM including a first memory portion and a second memory portion to which address lines, data lines, and memory control lines are individually connected;

memory control means for controlling said second memory portion so that said second memory portion functions as an imaginary double buffer, wherein one of said buffers in said imaginary double buffer is used for reading out image data from a serial access memory and a remaining other of said buffers is used for writing image data produced from said polygons into a RAM port;

data write means for writing two-dimensional texture data in said first memory portion, said two-dimensional texture data being expressed as one-dimensional texture data in said first memory portion, and a size of said one-dimensional texture data being less than a maximum value of a column address of said first memory portion, and for writing image data in said second memory portion;

detecting means for detecting completion of reading out of image data for each scan line of said imaginary double buffer;

clearing means for clearing, when a detection output is obtained from said detecting means, an associated scan line within a horizontal flyback period by means of a flash write function of said multiport DRAM;

next-address output means for outputting an address of a next-readout scan line of said scan line cleared by said clearing means; and refreshing means for refreshing a plurality of lines in said texture memory in synchronism with said clearing process of said clearing means and said address output operation of said next-address output means during a single horizontal flyback period by a RAS-only-refresh function.

6. The apparatus of claim 5, wherein said detecting means includes:

a serial clock generator having an output clock; and a scan line comparator for counting said output clock from said serial clock generator and comparing a result of said counting with a number of pixels of one line, thereby obtaining said detection output.

7. The apparatus according to claim 6, wherein said detection output is also supplied to a controller of a digital-to-analog converter for converting output data from said frame memory 8 to analog data.

8. An image processing apparatus according to claim 5, further comprising a state machine, wherein operations performed by said clearing means, said next-address output means and said refreshing means take place based on outputs of said state machine so that said refreshing, said clearing process and said next-address outputting process are performed in a synchronized manner.

9. An image processing apparatus comprising:

means for providing model data including image data and texture data;

a multi-port DRAM image memory having a serial access memory port and random access memory portion, said image memory including a first memory portion and a second memory portion to which address lines, data lines, and memory control lines are individually connected, said first memory portion storing said texture data in a one-dimensional array have a size that is less than a maximum value of a column address of said first memory;

memory control means for controlling said second memory portion such that said second memory portion functions as an imaginary double buffer memory, said memory control means also controlling said second memory portion such that one buffer in said imaginary double buffer memory is used for reading out said image data from said serial access memory port and a remaining other buffer in said imaginary double buffer memory is used for writing image data to said random access memory port; and refreshing means for refreshing a plurality of lines in said first memory in synchronism with a clearing process, wherein a scan line in said second memory portion is cleared, and a next-address outputting process, wherein an address of a next-readout scan line is provided to said second memory portion following said clearing process, said refreshing taking place during a single horizontal flyback period by a RAS-only-refresh function.

10. An image processing apparatus according to claim 9, further comprising a state machine, wherein said clearing process and said next-address outputting process means and said refreshing take place based on outputs of said state machine so that said refreshing, said clearing process and said next-address outputting process are performed in a synchronized manner.

11. An image processing apparatus comprising:

means for providing model data including image data and texture data;

a multi-port DRAM image memory having a serial access memory port and random access memory portion, said image memory including a first memory portion and a second memory portion to which address lines, data lines, and memory control lines are individually connected, said first memory portion storing said texture data;

memory control means for controlling said second memory portion such that said second memory portion functions as an imaginary double buffer memory, said memory control means also controlling said second memory portion such that one buffer in said imaginary double buffer memory is used for reading out said image data from said serial access memory port and a remaining other buffer in said imaginary double buffer memory is used for writing image data to said random access memory port;

detecting means for detecting when image data has been read out of each scan line of said imaginary double buffer;

clearing means for clearing an associated scan line within a horizontal flyback period by means of a flash write function when a detection output is obtained from said detecting means;

next-address outputting means for outputting an address of a next-readout scan line of said scan line cleared by said clearing means; and refreshing means for refreshing a plurality of lines in said texture memory in synchronism with said clearing process performed by said clearing means and said address outputting process performed by said next-address outputting means during a single horizontal flyback period by a RAS-only-refresh function.

12. An image processing apparatus according to claim 11, further comprising a state machine, wherein operations performed by said clearing means, said next-address output means and said refreshing means take place based on outputs of said state machine so that said refreshing, said clearing process and said next-address outputting process are performed in a synchronized manner.

* * * * *